June 30, 1936.  D. P. STEWARD  2,046,216
CAR WHEEL AND METHOD OF MANUFACTURE
Filed Oct. 24, 1935   2 Sheets-Sheet 1
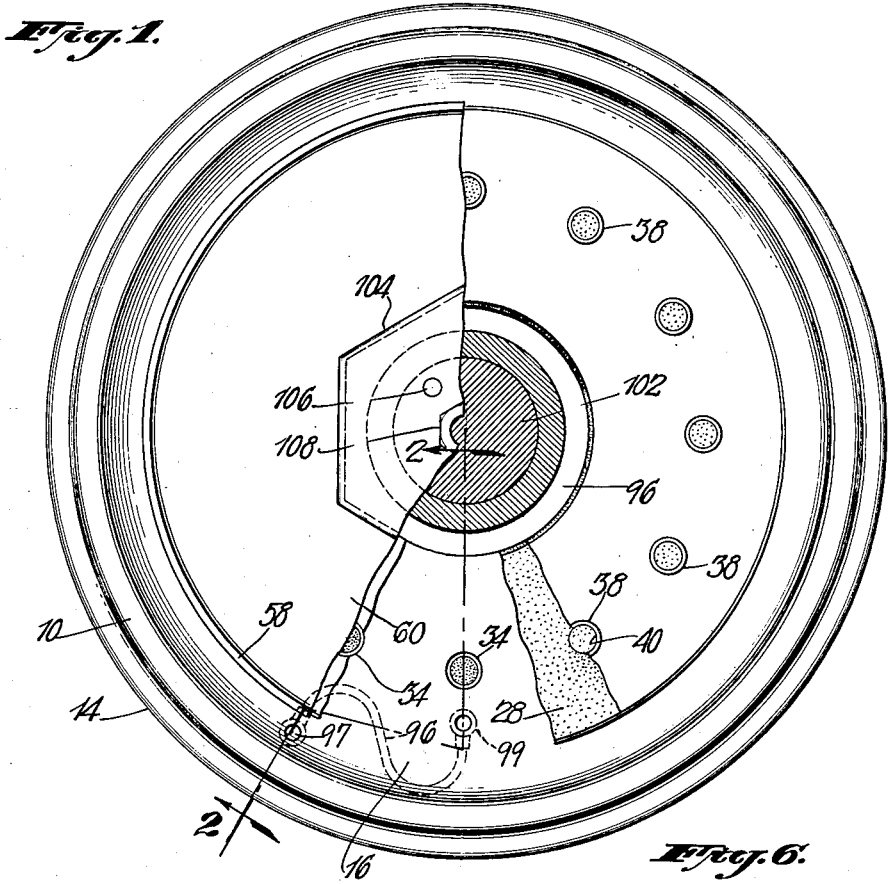
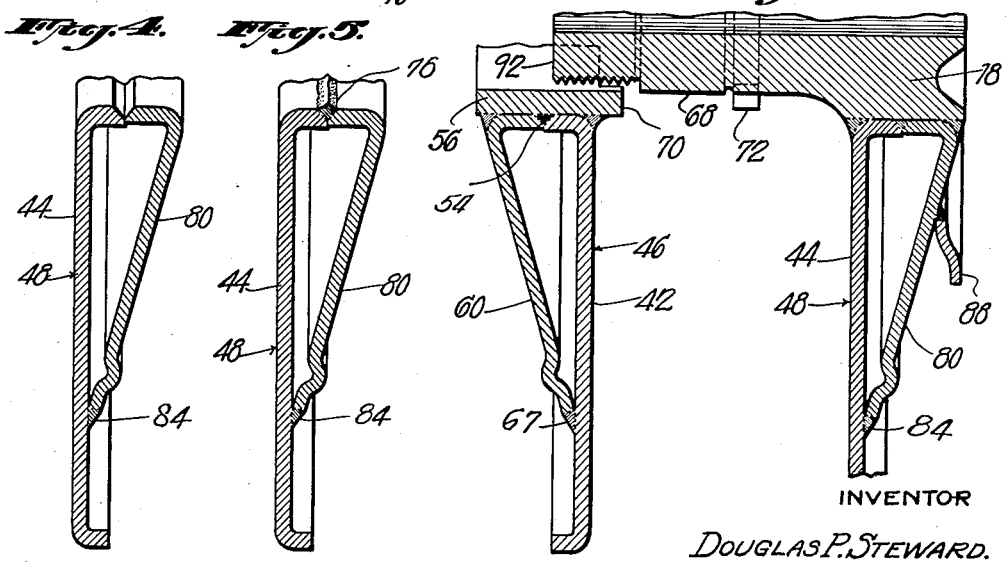
INVENTOR
DOUGLAS P. STEWARD.
BY
ATTORNEYS

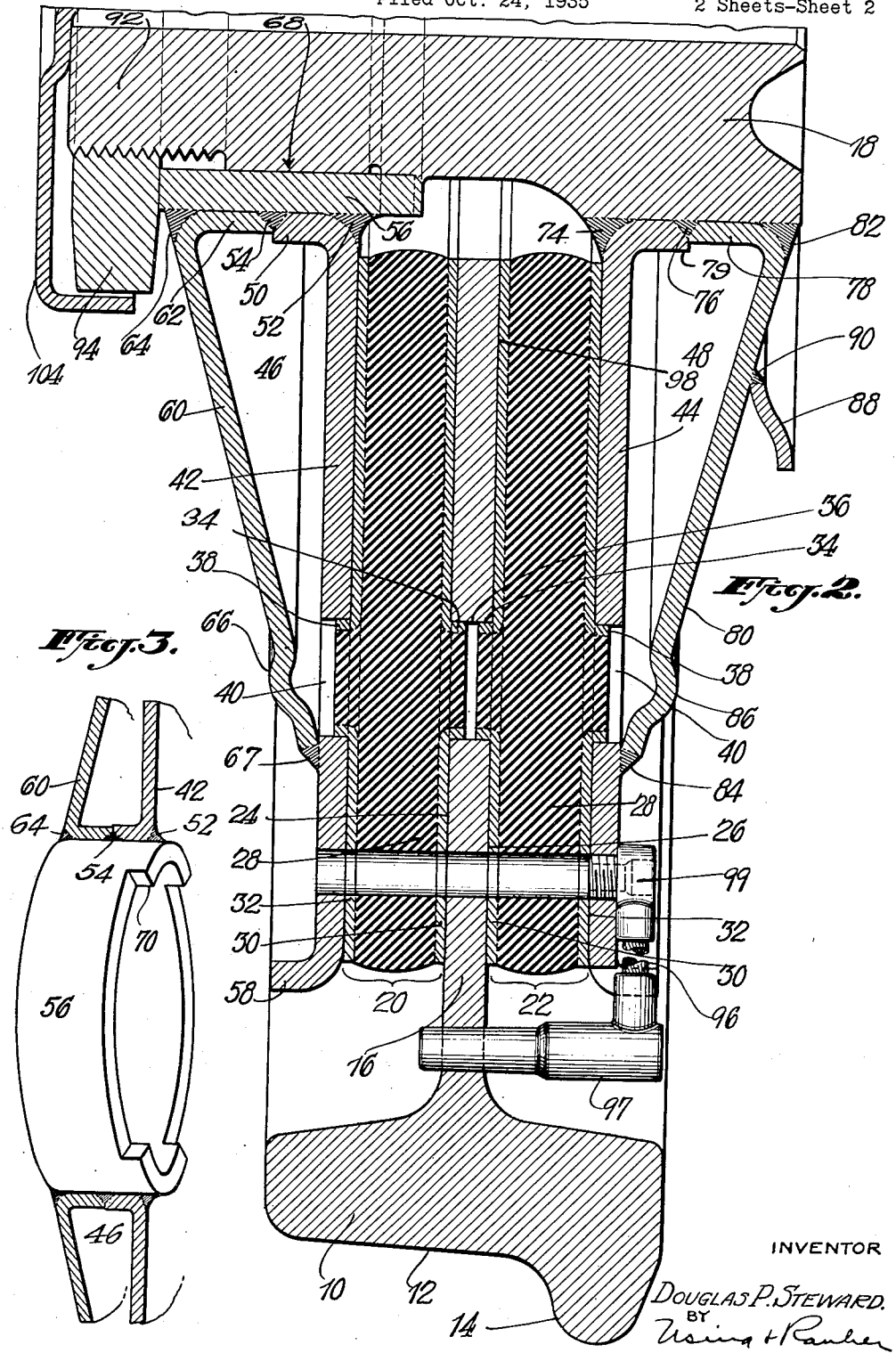

Patented June 30, 1936

2,046,216

UNITED STATES PATENT OFFICE 2,046,216

CAR WHEEL AND METHOD OF MANUFACTURE

Douglas P. Steward, Westmont, Pa.

Application October 24, 1935, Serial No. 46,627

10 Claims. (Cl. 29—168)

This invention relates to car wheels and their manufacture and particularly to an improved combination of correlated parts peculiarly well suited for incorporation in a resilient wheel embodying annular disc-like cushion members of rubber or equivalent elastic cushion material. The claimed features of the present invention as hereinafter more definitely pointed out relate to the construction and arrangement of the combined instrumentalities as well as to certain individual components of the assemblage, all as more fully defined in the appended claims. The invention will be fully apparent from the following detailed disclosure when read in connection with the accompanying drawings.

In the drawings—

Fig. 1 is a side elevation of a resilient wheel embodying the invention, portions thereof being broken away and shown in section; Fig. 2 is an enlarged transverse section through a portion of the wheel, the section being taken approximately on the staggered line 2—2 of Fig. 1; Fig. 3 is a fragmentary perspective view illustrating a detail of construction; Figs. 4 and 5 illustrate steps in the formation of one of the principal elements of the wheel; Fig. 6 illustrates the manner of assembling certain parts.

Referring in detail to the drawings, the invention is illustrated as embodied in a car wheel adapted for general railway service, the wheel being provided with integral flanged rim and web portions and a separately formed hub, which is resiliently secured to the web portion of the wheel by cheek elements of special formation designedly intended to have great strength to resist lateral forces, that is forces acting in the direction of length of the wheel axis. The cheek elements are each of two part flanged construction, in order that they may be producible from flat plate-like metals, and welded together without distorting the parts.

In the embodiment of the invention illustrated, the improved wheel includes the outer rim 10 having a standard cone tread 12 and flange 14. This rim is formed integrally with the web portion 16. The web is connected through cushion means, to be presently described, with a separately formed hub 18. The arrangement is such that there can be limited relative movement between the rim 12 and the hub 18 in both transverse and radial directions. Elastic cushion elements, indicated generally at 20 and 22, engage the opposite faces 24 and 26 of the web. Each cushion element includes a body of rubber, or equivalent elastic cushion material 28, held between plates 30 and 32. The plates 30 are each provided with a plurality of substantially cylindrical shell-like projections 34, which make a fairly snug fit with apertures 36 formed in the web 16 of the wheel. Other sleeve-like projections 38 extend into and make a similar fit with apertures 40 formed in the respective inner plates 42 and 44 of cheek members, indicated as a whole at 46 and 48.

The plates 42 and 44 of the cheek members are in face-to-face engagement with the respective plates 32—32 of the cushion members, the plate 42 of cheek member 46 having an inner annular flange 50 which is welded at 52 to a hub shell 56. At its outer portion, this plate 42 has a strengthening annular flange 58, as shown. In order to endow the cheek member 46 with great strength to resist transverse thrust, that is in a direction corresponding to the axis of rotation of the wheel, I provide a substantially frusto-conical plate 60 having an inner annular flange 62, which is secured to the flange 50 of the plate 42 by a weld 54. The plate 60 is welded at 64 to the hub shell 56. At its outer periphery, the plate 60 is welded to the plate 42, as indicated at 67. And an annular strengthening rib 66 may be near the outer periphery of the plate 60, as shown, if desired.

The hub shell 56 makes a fairly snug fit with the cylindrical surface 68 of the hub 18 and is cut away, as indicated at 70 in Fig. 3, so as to form a shoulder for engagement with a similar shoulder 72 (Fig. 6) projecting from the hub 18. This interengagement of the hub shell 56 and the hub adequately locks the two against relative rotary movement.

The plate member 44 of the cheek element 48 is welded directly to the hub 18 by a weld 74. A weld 76 serves to unite the annular flange 78 of the cone-like plate 80 of the cheek element 48 to the inner annular flange 79 of the plate 44. There is also an annular weld 82 uniting the flange 78 to the hub as shown. The outer periphery of the cone-like plate 80 is welded at 84 to the plate 44. The plate 80 is also provided with an annular reinforcing rib 86. In some cases, a shield ring, as indicated at 88, may be secured to the plate 80 by an annular weld 90, as shown.

The hub 18 has a screw threaded shank 92 formed on its outer end for engagement with a nut 94 which, when screwed up tight, will press the sleeve 56 and, therefore, the cheek member 46, toward the cheek member 48 and if desired sufficient pressure may be exerted to place the cushions under considerable compression.

The wheel illustrated is provided with a conducting bond 96, which has terminal portions 97 and 99, which are effective to maintain an electric circuit from the rail through the wheel rim, the flange plates 44 and 46 and wheel hub to the axle 102.

A shell-like cover member 104 of substantially hexagonal form is provided to serve as a cover and lock for the nut 94. This cover member has an inwardly punched portion 106 for engagement with an aperture formed in the end of the axle and a bolt 108 is adapted to be screwed into a suitably threaded aperture in the end of the axle, so as to hold the cover in place.

In the manufacture of the wheel described, the cheek element 48 is permanently welded to the hub 18, as indicated in Fig. 6. The flanged plates 42 and 60 of the cheek element 46 are then fabricated, these two parts first being united by the weld 67, as indicated in Fig. 6, and then being united at the weld 54, as indicated in Fig. 6. The provision of the flanges 50 and 62 prevents the buckling or distortion of the parts by the welding heat. After the weld joint 54 is completed the flanges 50 and 62 are bored or reamed out to make a press fit with the hub shell 56. These parts are then welded at 52 and 64 to the hub shell 56. The cushion member 22 is then assembled so that the plurality of sleeve-like projections 38 thereof engage the apertures 40 of the cheek plate 44. The integral rim and web of the car wheel is then engaged with the shell-like projections 34 of the cushion members.

Thereupon, the cushion element 20 is assembled with its laterally projecting sleeve-like portions 34 engaging the apertures 36 in the web of the wheel. The sub-assembly, consisting of the hub shell 56 and the outer cheek element, is then engaged with the hub 18, as suggested in Fig. 6 and the parts are finally assembled, as shown in Fig. 2, by screwing on the nut 94 and attaching the cap 104. The cooperating parts, when assembled as shown and described, provide a resilient wheel suitable for railway car use, which can adequately withstand the radial thrusts encountered in service.

In the manufacture of the cheek elements described it is deemed important to provide the substantially flat inner members 42 and 44 with the inner and outer annular flanges and to weld the inner flanges to the abutting edges of the inner flanges of the cone-like elements 60 and 80. The annular flanges of these members serve to stiffen and rigidify the parts and prevent distortion during the operation of welding either when forming the welds 54, 76 or the welds 67, 84. After the inner flanges are welded the parts are bored for the reception of the hub shell 56 on the hub portion 18 whereupon the welds 64, 52, 74 and 82 are made as above described to firmly secure the parts.

While I have described quite precisely the specific embodiment of the invention herein illustrated, it is to be understood that various modifications and substitutions of equivalents may be made by those skilled in the art without departure from the invention as defined in the appended claims.

What I claim is:—

1. A resilient car wheel comprising web and rim portions, a hub separate therefrom, cushions having an interlocking engagement with said web and flanged cheek elements with their flanges welded end to end secured to the hub and also interlocked with said cushions and means holding the cheek elements in engagement with said cushions.

2. A resilient car wheel comprising an integral web and rim, a hub separate therefrom, cushions in face-to-face engagement with opposite sides of said web, and having an interlocking engagement therewith, cheek elements including inner flanged plates and outer cone-like flanged plates whose flanges are welded to one another end to end and which flanges are also welded to said hub, the inner plates engaging the outer faces of said cushions and having portions in interlocking engagement therewith.

3. A resilient car wheel comprising an integral metal web and rim, a metal hub separate therefrom, metal sheathed rubber cushions on opposite sides of and interengaged with said web and respective hollow cone-like flanged cheek elements of rolled metal interengaged with said cushions, one of the cheek elements having inner flanges welded end to end and also to said hub, a shell slidably engaging the hub and having the other of said cheek elements welded thereto and means on the hub holding the parts referred to in assembled relationship.

4. A cheek element for a wheel of the character described comprising a substantially flat plate having inner and outer annular flanges and a frusto-conical plate welded at its outer periphery to said flat plate and having an inner annular flange welded to the inner flange of said flat plate.

5. A cheek element for a wheel of the character described comprising a substantially flat plate having inner and outer annular flanges, and a frusto-conical plate welded at its outer periphery to the surface of the flat plate and having an inner annular flange welded in edge to edge engagement to the inner flange of said flat plate.

6. A cheek element for a wheel of the character described comprising a substantially flat plate having inner and outer annular flanges and a frusto-conical plate welded at its outer periphery to said flat plate and having an inner annular flange welded to the inner flange of said flat plate and a hub element to which said inner flanges are also welded.

7. In the manufacture of wheels of the character described, the method which comprises forming inner and outer flanges on a substantially flat plate, forming a frusto-conical plate with an inner annular flange of substantially the same diameter as the inner flange of said flat plate, welding the outer periphery of the conical plate to the surface of the flat plate, abutting the edges of the inner flanges of the said flat and conical plates and welding them together, and securing the thus assembled parts to a hub element.

8. In the manufacture of wheels of the character described, the method which comprises forming a substantially flat plate with an inner annular flange, forming a substantially conical plate with a similar inner annular flange, welding the outer periphery of the conical plate to the surface of the flat plate, abutting the edges of the said annular flanges of the two said plates and welding them to one another, and then welding said inner flanges to a hub element.

9. A resilient car wheel comprising a web and rim portions, a hub separate therefrom, cushions having an interlocking engagement with said web and flanged cheek elements having flanges secured to one another and to said hub and interlocked with said cushions and means holding the cheek elements in engagement with said cushions.

10. In the manufacture of wheels of the character described, the method which comprises forming a substantially flat plate with an inner annular flange, forming a substantially conical plate with a similar inner annular flange, welding the outer portion of the conical plate to the surface of the flat plate, securing the inner annular flanges of the said two plates to one another and welding the thus secured parts to a hub element.

DOUGLAS P. STEWARD.